United States Patent
Kondrad et al.

(10) Patent No.: US 9,712,891 B2
(45) Date of Patent: Jul. 18, 2017

(54) METHOD AND APPARATUS FOR SELECTING AN ACCESS METHOD FOR DELIVERY OF MEDIA

(75) Inventors: Lukasz Kondrad, Tampere (FI); Miska Hannuksela, Ruutana (FI)

(73) Assignee: Nokia Technologies Oy, Espoo (FI)

( * ) Notice: Subject to any disclaimer, the term of this patent is extended or adjusted under 35 U.S.C. 154(b) by 26 days.

(21) Appl. No.: 13/286,466

(22) Filed: Nov. 1, 2011

(65) Prior Publication Data

US 2013/0111028 A1 May 2, 2013

(51) Int. Cl.
*G06F 15/173* (2006.01)
*H04N 21/845* (2011.01)
(Continued)

(52) U.S. Cl.
CPC ..... *H04N 21/8456* (2013.01); *H04L 65/1006* (2013.01); *H04L 65/1016* (2013.01); *H04L 65/80* (2013.01); *H04L 67/02* (2013.01)

(58) Field of Classification Search
CPC ... H04L 65/4084; H04L 65/80; H04L 12/189; H04L 12/185; H04L 45/16; H04L 45/02; H04L 45/28; H04L 29/12839; H04L 61/6022; H04L 65/4076; H04L 12/1886; H04L 29/12292; H04L 61/2069; H04L 65/1069; H04L 12/1485; H04L 12/1836;
(Continued)

(56) References Cited

U.S. PATENT DOCUMENTS 6,594,699 B1 * 7/2003 Sahai et al. ............... 709/228
8,547,834 B1 * 10/2013 Reeves et al. ............. 370/230
(Continued)

FOREIGN PATENT DOCUMENTS

CN 102 130 936 A 7/2011
EP 2 592 809 A1 5/2013
(Continued)

OTHER PUBLICATIONS

Zurek-Terhardt; "ATSC Mobile DTV Application Note" Rohde & Schwarz; May 2009.*
(Continued)

*Primary Examiner* — Shean Tokuta
(74) *Attorney, Agent, or Firm* — Alston & Bird LLP

(57) ABSTRACT

Various methods are described for selecting an access method for receiving a DASH media presentation. One example method may comprise providing for reception of a media presentation description. The media presentation description may identify a first set of access methods for receiving media and may provide attribute values associated with each of the access methods. The method of this example embodiment may further comprise identifying a second set of access methods supported by an apparatus. Furthermore, the method of this example embodiment may comprise determining a third set of access methods belonging to both the first set and the second set. The method of this example embodiment may further comprise selecting an access method from the third set based at least in part on the attribute values associated with the access method. Similar and related example methods, example apparatuses, and example computer program products are also provided.

15 Claims, 6 Drawing Sheets

(51) Int. Cl.
 *H04L 29/08* (2006.01)
 *H04L 29/06* (2006.01)

(58) Field of Classification Search
 CPC ............ H04L 12/1863; H04L 12/1868; H04N 21/23439
 USPC ........................................ 709/219, 225, 231
 See application file for complete search history.

(56) References Cited

U.S. PATENT DOCUMENTS

| | | | |
|---|---|---|---|
| 2002/0009997 A1* | 1/2002 | Stuempert et al. | 455/439 |
| 2002/0144276 A1* | 10/2002 | Radford et al. | 725/87 |
| 2004/0095958 A1* | 5/2004 | Ejzak et al. | 370/465 |
| 2006/0085553 A1 | 4/2006 | Rachwalski et al. | |
| 2006/0184973 A1* | 8/2006 | de Heer et al. | 725/80 |
| 2007/0019620 A1* | 1/2007 | Surana | 370/352 |
| 2007/0101012 A1* | 5/2007 | Li et al. | 709/231 |
| 2007/0168523 A1* | 7/2007 | Jiang et al. | 709/228 |
| 2007/0168534 A1* | 7/2007 | Hiltunen et al. | 709/230 |
| 2008/0141303 A1* | 6/2008 | Walker et al. | 725/39 |
| 2009/0006533 A1 | 1/2009 | Guo | |
| 2009/0019509 A1* | 1/2009 | Horn et al. | 725/118 |
| 2009/0172170 A1* | 7/2009 | Rey | 709/227 |
| 2009/0316615 A1* | 12/2009 | Vedantham | H04W 36/02 370/312 |
| 2010/0121977 A1 | 5/2010 | Kontola et al. | |
| 2010/0169504 A1* | 7/2010 | Gabin et al. | 709/231 |
| 2010/0318600 A1 | 12/2010 | Furbeck | |
| 2011/0055867 A1* | 3/2011 | Lee et al. | 725/40 |
| 2011/0082939 A1* | 4/2011 | Montemurro et al. | 709/227 |
| 2011/0238789 A1* | 9/2011 | Luby | H04N 21/23106 709/219 |
| 2011/0269437 A1* | 11/2011 | Marusi et al. | 455/414.1 |
| 2012/0020413 A1* | 1/2012 | Chen et al. | 375/240.26 |
| 2012/0023251 A1* | 1/2012 | Pyle et al. | 709/231 |
| 2012/0259994 A1* | 10/2012 | Gillies et al. | 709/231 |
| 2013/0007814 A1* | 1/2013 | Cherian | H04L 65/605 725/62 |

FOREIGN PATENT DOCUMENTS

| | | |
|---|---|---|
| WO | WO 01/93109 A2 | 12/2001 |
| WO | WO 2011/002901 A1 | 1/2011 |
| WO | WO 2011/038032 A2 | 3/2011 |
| WO | WO 2011/070552 A1 | 6/2011 |
| WO | WO 2011/087449 A1 | 7/2011 |

OTHER PUBLICATIONS

Handley et al. "SDP: Session Description Protocol" Network Working Group; Apr. 1998.*

3rd Generation Partnership Project, "MPD Changes to Support DASH over Broadcast," *3GPP TSG-SA4 Meeting #65*, Kista, Sweden, Aug. 15-19, 2011, Document No. S4-110761.

3rd Generation Partnership Project, "MPD Changes to Support DASH over Broadcast," *3GPP TSG-SA4 Meeting #65*, Kista Sweden, Aug. 15-19, 2011, Document No. S4-110626.

Robinson, D., et al., "Network Working Group, Request for Comments: The Common Gateway Interface (CGI) Version 1.1," *The Apache Software Foundation*, Oct. 2004, pp. 1-34.

3rd Generation Partnership Project, "3$^{rd}$ Generation Partnership Project; Technical Specification Group Services and System Aspects; Multimedia Broadcast/Multicast Service (MBMS); Protocols and codecs (Release 10)," *3GPP TS 26.346 V10.1.0*, Sep. 2011, pp. 1-151.

3rd Generation Partnership Project, "3$^{rd}$ Generation Partnership Project; Technical Specification Group Services and System Aspects; Transparent End-to-End Packet Switched Streaming Service (PSS); Progressive Download and Dynamic Adaptive Streaming over HTTP (3GP-DASH) (Release 10)," *3GPP TS 26.247 V10.0.0*, Jun. 2011, pp. 1-94.

3rd Generation Partnership Project, "3$^{rd}$ Generation Partnership Project; Technical Specification Group Services and System Aspects; Transparent End-to-End Packet-Switched Streaming Service (PSS); Protocols and codecs (Release 10)," *3GPP TS 26.234 V10.0.0*, Mar. 2011, pp. 1-193.

Moving Picture Experts Group, "Reply to CfP on HTTP Streaming: 3GPP Adaptive HTTP Streaming," 2010, MPEG Document No. M17875.

International Searching Authority, International Search Report for International Application No. PCT/FI2012/051052, mailed Feb. 5, 2013, National Board of Patents and Registration of Finland, 6 pages, Finland.

3GPP TS 26.247 V1.0.0 (Sep. 2010); 3$^{rd}$ Generation Partnership Project; Technical Specification Group Services and System Aspects Transparent end-to-end Packet-switched Streaming Service (PSS); Progressive Download and Dynamic Adaptive Streaming over HTTP (3GP-DASH); Release 10; Sep. 2010.

Extended European Search Report from European Patent Application No. 12845293.5 dated May 28, 2015.

Communication Pursuant to Rules 70(2) and 70a(2) EPC from European Patent Application No. 12845293.5 dated Jun. 15, 2015.

Written Opinion from International Application No. PCT/FI2012/051052 dated Feb. 5, 2013.

Office Action for corresponding Chinese Application No. 201280050849.9 dated Dec. 17, 2015.

Office Action for Chinese Application No. 2012800508499 dated Aug. 25, 2016.

MPD Changes to Support DASH Over Broadcast, 3GPP TSG-SA4 Meeting #65, S4-110761, Qualcomm Incorporated (Aug. 15-19, 2011) 4 pages.

Office Action for corresponding Chinese Application No. 201280050849.9 dated Feb. 10, 2017, with English translation, 14 pages.

* cited by examiner

METHOD AND APPARATUS FOR SELECTING AN ACCESS METHOD FOR DELIVERY OF MEDIA

TECHNICAL FIELD

Embodiments of the present invention relate generally to communication technology, and, more particularly, relate to a method and apparatus for selecting an access method for receiving media content via DASH.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, for example, improvements are being made to the universal mobile telecommunications system (UMTS) terrestrial radio access network (UTRAN). Further, for example, the evolved-UTRAN (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards.

As a result of improved networking technologies, the capacity for visual and audible media content distribution over the Internet has continued to increase. Users desire efficient and optimized access to this growing amount of media content through various access methods. An emerging standard for distributing media content to devices is known as dynamic adaptive streaming over Hypertext Transfer Protocol (HTTP) (DASH). The DASH standard provides media content for distribution based on a media presentation structure. The media presentation structure of DASH, however, focuses on the media content and not the method(s) a client can use for accessing the content.

Accordingly, it may be desirable to provide systems, methods, apparatuses, and computer program products for enabling a client to intelligently select an access method for receiving a DASH media presentation.

SUMMARY

The various DASH standards (e.g., 3GPP DASH, MPEG DASH, etc.) define the format of a media presentation. A media presentation may comprise a sequence of one or more consecutive periods. Each period may comprise one or more representations of media content, which typically differ by encoding choice (e.g., bitrate, resolution, language, codec, etc.). A representation may comprise one or more media components, such that each media component defines an encoded version of a particular media type (e.g., audio, video, timed text, etc.). Each media component of the representation may comprise one or more media segments, each of which may contain media data and/or metadata related to the media content of the media presentation. Each media segment may be referenced by a unique HTTP Uniform Resource Locator (URL), which in some instances may be restricted by a byte range. The various representations of a media presentation may be assigned to one or more adaptation sets, such that representations in the same adaptation set are alternatives to each other and may be automatically switched during download and playback of the media presentation based on a number of factors associated with the download and playback (e.g., available bandwidth, time of access, etc.).

Typically, a media presentation is represented and described by a Media Presentation Description (MPD), which may also be referred to as a playlist file, manifest file, or streaming manifest file. For example, the media presentation may be represented by an MPD defined as a well-formatted Extensible Markup Language (XML) document according to a particular XML schema. According to DASH standards, an MPD, as well as the associated media presentation, may be accessible according to various types of delivery methods. For example, the media presentation defined by the MPD may be accessible via unicast (e.g., via Packet-Switched Streaming (PSS) service), multicast (e.g., Multimedia Broadcast Multicast Services (MBMS)), and broadcast (e.g., via Digital Video Broadcasting-Handheld (DVB-H), MBMS, etc.) connections. Currently, the MPD does not provide any information about the various methods available to an end user for accessing the media presentation. A need, therefore, exists to allow an MPD to identify available access methods to a DASH client, as well as to provide custom parameters corresponding to the different access methods. Various embodiments of the invention described below seek to offer solutions to the problem by providing apparatuses and methods for selecting an access method for receiving a DASH media presentation.

Methods, apparatuses, and computer program products are herein provided for selecting an access method for receiving a DASH media presentation. Systems, methods, apparatuses, and computer program products in accordance with various embodiments may provide several advantages to computing devices, computing device users, and network providers. Some example embodiments advantageously enable a terminal device to determine the various methods available for accessing a media presentation via an MPD. In this regard, the terminal device may decide which access method is most convenient for the device given its current state. For example, various embodiments advantageously enable a terminal device to consider factors such as the current location and mobility of the device, the reception bitrate or throughput available for the various access methods, the time of access, and other costs and preferences when determining which of the available access methods to employ. Furthermore, various advantageous embodiments allow a single MPD to provide customized attributes for providing the media presentation with respect to each access method.

In an example embodiment, a method is provided, which may comprise providing for reception of a media presentation description. The media presentation description may identify a first set of one or more access methods for receiving media associated with the media presentation description, and may provide one or more attribute values associated with each of the one or more access methods. The method of this example embodiment may further comprise identifying a second set of one or more access methods supported by an apparatus. The method of this example embodiment may also comprise determining a third set of one or more access methods belonging to both the first set and the second set. The method of this example embodiment may further comprise selecting an access method from the third set based at least in part on the one or more attribute values associated with the access method.

In another example embodiment, an apparatus comprising at least one processor and at least one memory storing computer program code is provided. The at least one memory and stored computer program code may be configured, with the at least one processor, to cause the apparatus of this example embodiment to at least provide for reception of a media presentation description. The media presentation description may identify a first set of one or more access methods for receiving media associated with the media presentation description, and may provide one or more attribute values associated with each of the one or more access methods. The at least one memory and stored computer program code may be configured, with the at least one processor, to further cause the apparatus of this example embodiment to identify a second set of one or more access methods supported by an apparatus. Furthermore, the at least one memory and stored computer program code may be configured, with the at least one processor, to cause the apparatus of this example embodiment to determine a third set of one or more access methods belonging to both the first set and the second set. The at least one memory and stored computer program code may be configured, with the at least one processor, to further cause the apparatus of this example embodiment to select an access method from the third set based at least in part on the one or more attribute values associated with the access method.

In another example embodiment, an apparatus is provided, which may comprise means for providing for reception of a media presentation description. The media presentation description may identify a first set of one or more access methods for receiving media associated with the media presentation description, and may provide one or more attribute values associated with each of the one or more access methods. The apparatus of this example embodiment may further comprise means for identifying a second set of one or more access methods supported by an apparatus. Furthermore, the apparatus of this example embodiment may comprise means for determining a third set of one or more access methods belonging to both the first set and the second set. The apparatus of this example embodiment may further comprise means for selecting an access method from the third set based at least in part on the one or more attribute values associated with the access method.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
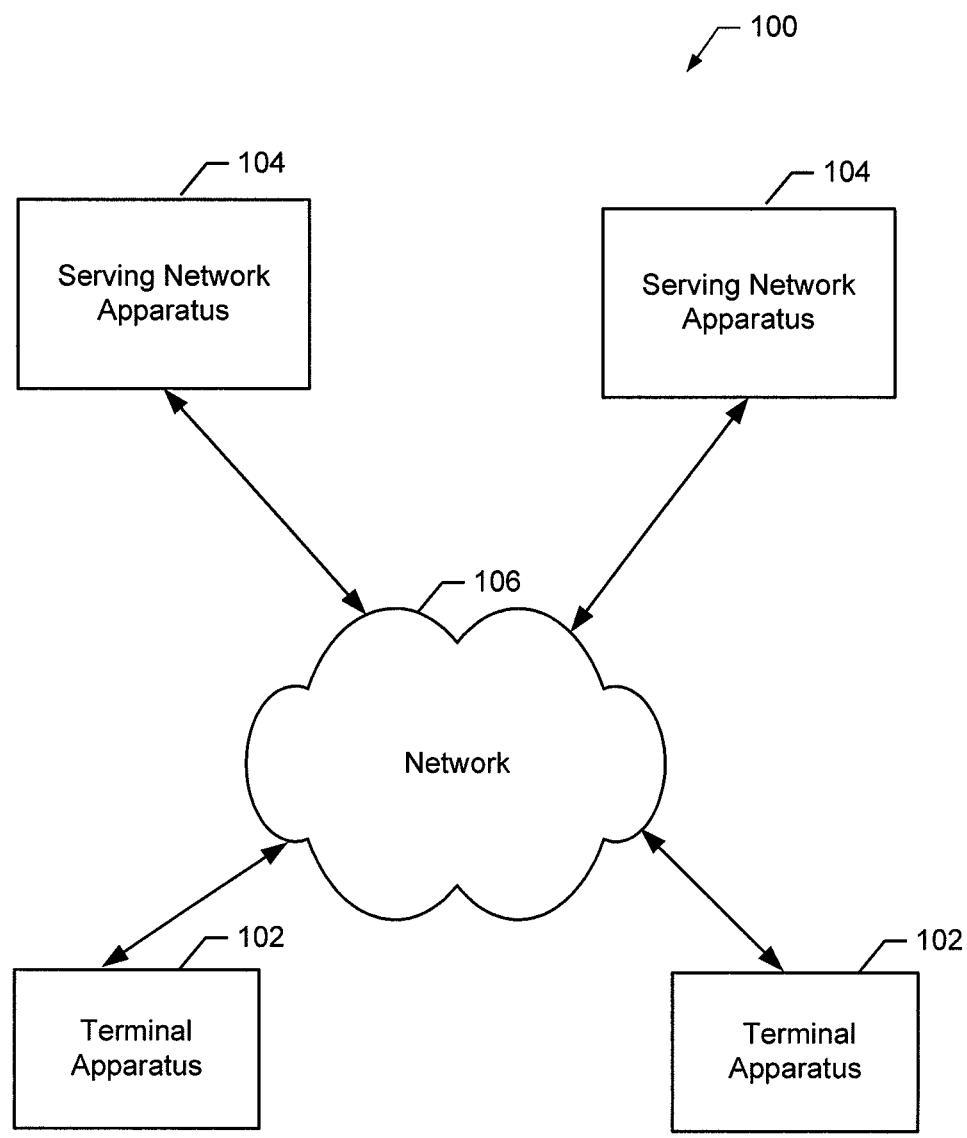
FIG. 1 illustrates a system for selecting an access method for receiving a DASH media presentation according to some example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

Referring now to FIG. 1, FIG. 1 illustrates a block diagram of a system 100 for selecting an access method for receiving a DASH media presentation according to an example embodiment. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for selecting an access method for receiving a DASH media presentation, numerous other configurations may also be used to implement embodiments of the present invention.

The system 100 may include one or more terminal apparatuses 102 and one or more serving network apparatuses 104. The system 100 may further comprise a network 106. The network 106 may comprise one or more wireline networks, one or more wireless networks, or some combination thereof. The network 106 may, for example, comprise a serving network (e.g., a serving cellular network) for one or more terminal apparatuses 102. The network 106 may comprise, in certain embodiments, one or more of the terminal apparatuses 102 and serving network apparatuses 104 themselves. According to example embodiments, the network 106 may comprise the Internet. The network 106 may comprise, in some embodiments, a Content Delivery Network (CDN), which may also be referred to as a Content Distribution Network. In various embodiments, the network 106 may comprise a wired access link connecting one or more terminal apparatuses 102 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) LTE (also referred to as LTE-A) standards, current and future implementations of International Telecommunications Union (ITU) International Mobile Telecommunications-Advanced (IMT-A) systems standards, and/or the like. It will be appreciated, however, that where references herein are made to a network standard and/or terminology particular to a network standard, the references are provided merely by way of example and not by way of limitation.

According to various embodiments, one or more terminal apparatuses 102 may be configured to connect directly with one or more serving network apparatuses 104 via, for example, an air interface without routing communications via one or more elements of the network 106. Alternatively, one or more of the terminal apparatuses 102 may be configured to communicate with one or more of the serving network apparatuses 104 over the network 106. In this regard, the serving network apparatuses 104 may comprise one or more nodes of the network 106. For example, in some example embodiments, the serving network apparatuses 104 may be at least partially embodied on one or more computing devices that comprise an element of a radio access network (RAN) portion of the network 106. In this regard, the serving network apparatuses 104 may, for example, be at least partially embodied on an access point of the network 106 (for example, a macrocell, microcell, picocell, femtocell, closed subscriber group (CSG) cell, base station, base transceiver station (BTS), node B, evolved node B, access point (AP), group owner, mesh station (STA), mesh point, and/or the like), which may, for example be configured to provide access to the network 106 (e.g., via a radio uplink) to one or more of the terminal apparatuses 102. In some embodiments, the serving network apparatuses 104 may comprise an Access Network Discovery and Selection Function (ANDSF), and/or the like. Accordingly, each of the serving network apparatuses 104 may comprise a network node or a plurality of network nodes collectively configured to perform one or more operations attributed to the serving network apparatus 104 as described with respect to various example embodiments disclosed herein.

According to various embodiments, the system 100 may be configured according to an architecture for providing for distribution of media content. In this regard, the system 100 may be configured as an HTTP streaming system. For example, the system 100 may be configured to distribute one or more media presentations, as defined by a DASH standard such as 3GPP DASH or Moving Picture Experts Group (MPEG) DASH.

Figure 6:
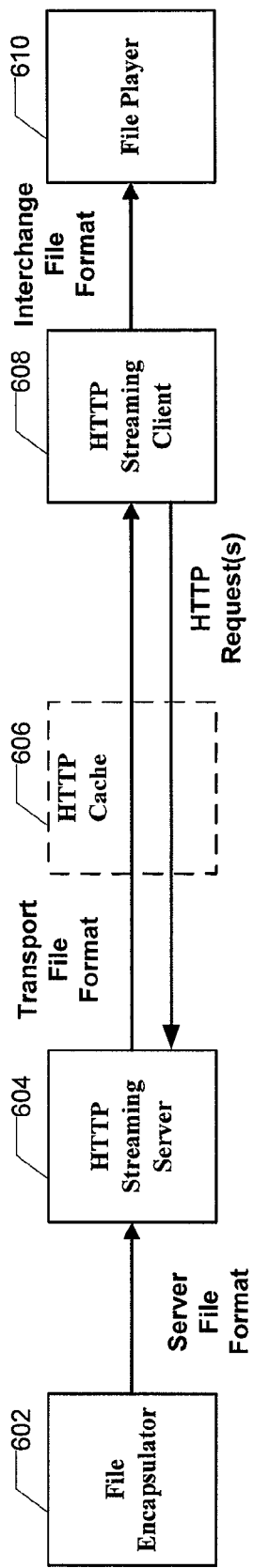
FIG. 6 illustrates an example HTTP streaming system that may benefit from various embodiments of the present invention.

FIG. 6 provides an example embodiment of an HTTP streaming system that may benefit from various embodiments of the present invention. As shown in FIG. 6, the system 100 may comprise a file encapsulator 602 configured to encapsulate the media content according to a server file format. The system 100 of this example may further comprise an HTTP streaming server 604 (e.g., a serving network apparatus 104) configured to distribute the media content in a transport file format. An HTTP streaming client 608 (e.g., a terminal apparatus 102) may be configured to receive the media content from the HTTP streaming server 604, in some instances in response to one or more HTTP request(s). The distribution of the media content, in this example embodiment, may be improved through the use of an HTTP cache 606 (e.g., another serving network apparatus 104). Once received, the HTTP streaming client 608 may provide the media content in an interchange file format to a file player 610 for reproduction.

A terminal apparatus 102 may be embodied as any computing device, such as, for example, a desktop computer, laptop computer, mobile terminal, mobile computer, mobile phone, mobile communication device, tablet computing device, game device, digital camera/camcorder, audio/video player, television device, radio receiver, digital video recorder, positioning device, wrist watch, portable digital assistant (PDA), fixed transceiver device (e.g., attached to traffic lights, energy meters, light bulbs, and/or the like), a chipset, an apparatus comprising a chipset, any combination thereof, and/or the like.

Figure 2:
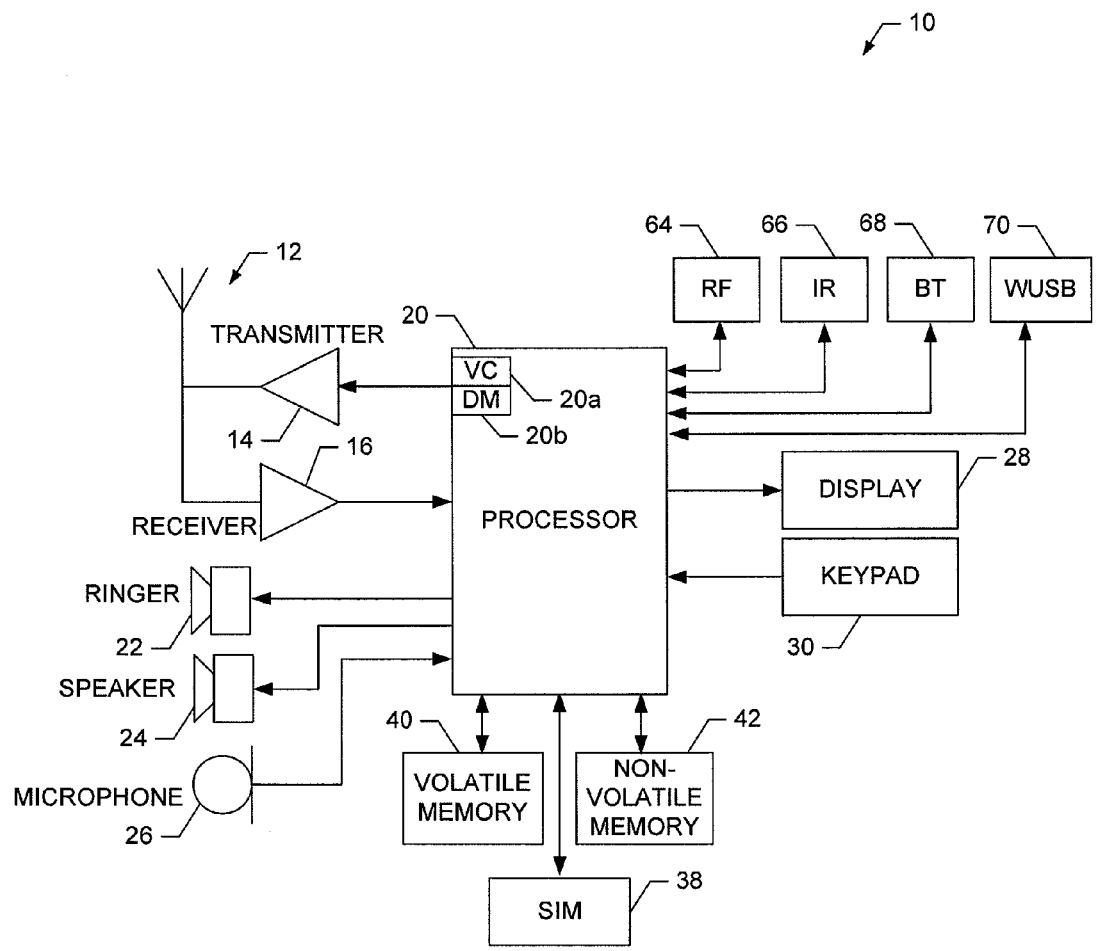
FIG. 2 illustrates a schematic block diagram of a mobile terminal according to some example embodiments of the present invention.

In some example embodiments, a terminal apparatus 102 may be embodied as a mobile terminal, such as that illustrated in FIG. 2. In this regard, FIG. 2 illustrates a block diagram of a mobile terminal 10 representative of one embodiment of a terminal apparatus 102. It should be understood, however, that the mobile terminal 10 illustrated and hereinafter described is merely illustrative of one type of computing device (i.e., terminal apparatus 102) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
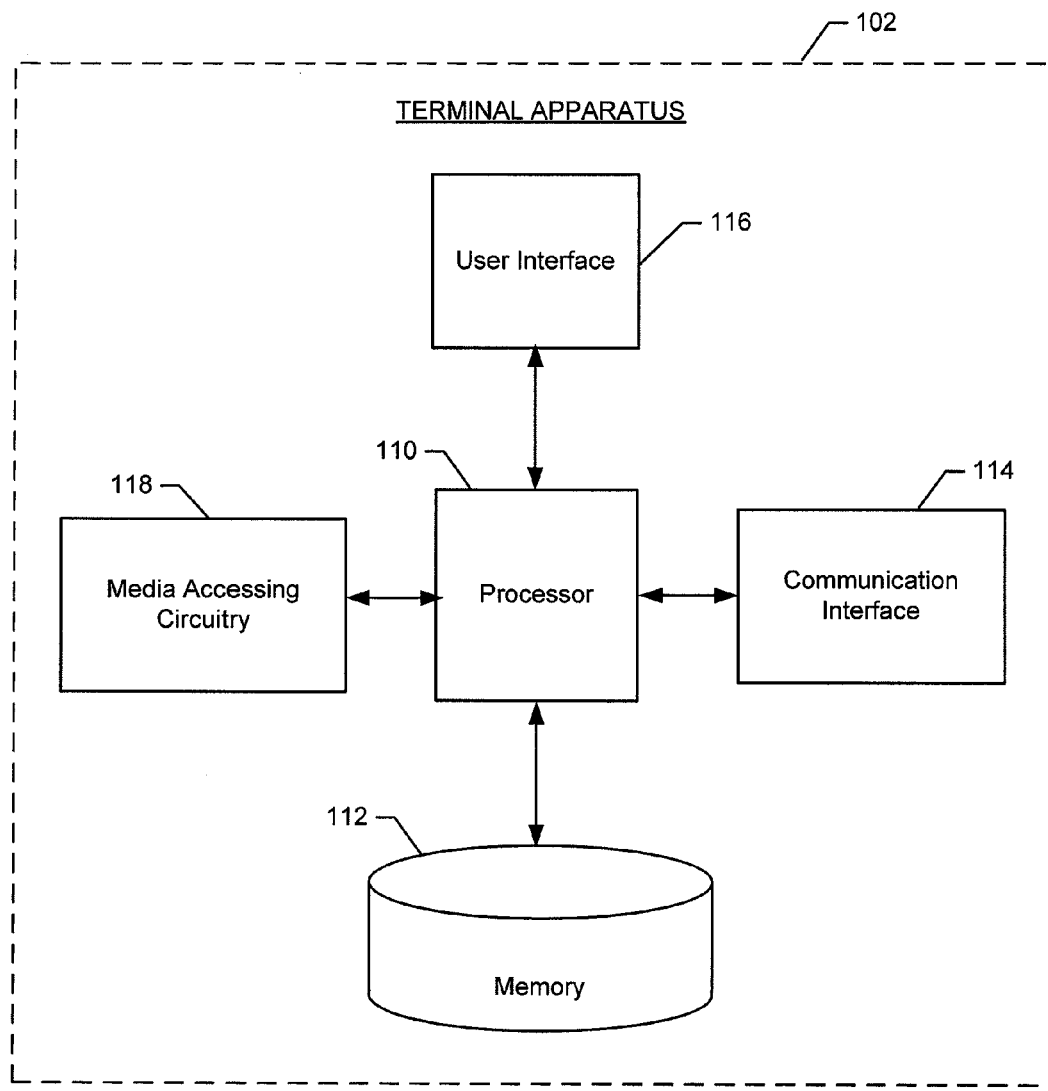
FIG. 3 illustrates a block diagram of a terminal apparatus according to some example embodiments of the present invention.

Referring now to FIG. 3, FIG. 3 illustrates a block diagram of a terminal apparatus 102 according to an example embodiment. In the example embodiment, the terminal apparatus 102 may comprise various means for performing the various functions herein described. These means may comprise one or more of a processor 110, memory 112, communication interface 114, user interface 116, or media accessing circuitry 118. The means of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 112) that is executable by a suitably configured processing device (e.g., the processor 110), or some combination thereof.

In some example embodiments, one or more of the means illustrated in FIG. 3 may be embodied as a chip or chip set. In other words, the terminal apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or media accessing circuitry 118 may be embodied as a chip or chip set. The terminal apparatus 102 may therefore, in some example embodiments, be configured to implement embodiments of the present invention on a single chip or as a single "system on a chip." As another example, in some example embodiments, the terminal apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the terminal apparatus 102 as described herein. The plurality of processors may be embodied on a single computing device or distributed across a plurality of computing devices collectively configured to function as the terminal apparatus 102. In embodiments wherein the terminal apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the terminal apparatus 102 to perform one or more of the functionalities of the terminal apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the terminal apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 102 is embodied as a mobile terminal 10, the memory 112 may comprise the volatile memory 40 and/or the non-volatile memory 42. The memory 112 may be configured to store information, data, applications, instructions, or the like for enabling the terminal apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the media accessing circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the terminal apparatus 102 and one or more computing devices or computing resources may be in communication. As an example, the communication interface 114 may be configured to enable communication between the terminal apparatus 102 and another device, such as another terminal apparatus 102. As a further example, the communication interface 114 may be configured to enable communication with a serving network apparatus 104 via the network 106. The communication interface 114 may additionally be in communication with the memory 112, user interface 116, and/or media accessing circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or media accessing circuitry 118, such as via a bus.

The media accessing circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the media accessing circuitry 118 is embodied separately from the processor 110, the media accessing circuitry 118 may be in communication with the processor 110. The media accessing circuitry 118 may further be in communication with one or more of the memory 112, communication interface 114, or user interface 116, such as via a bus.

Figure 4:
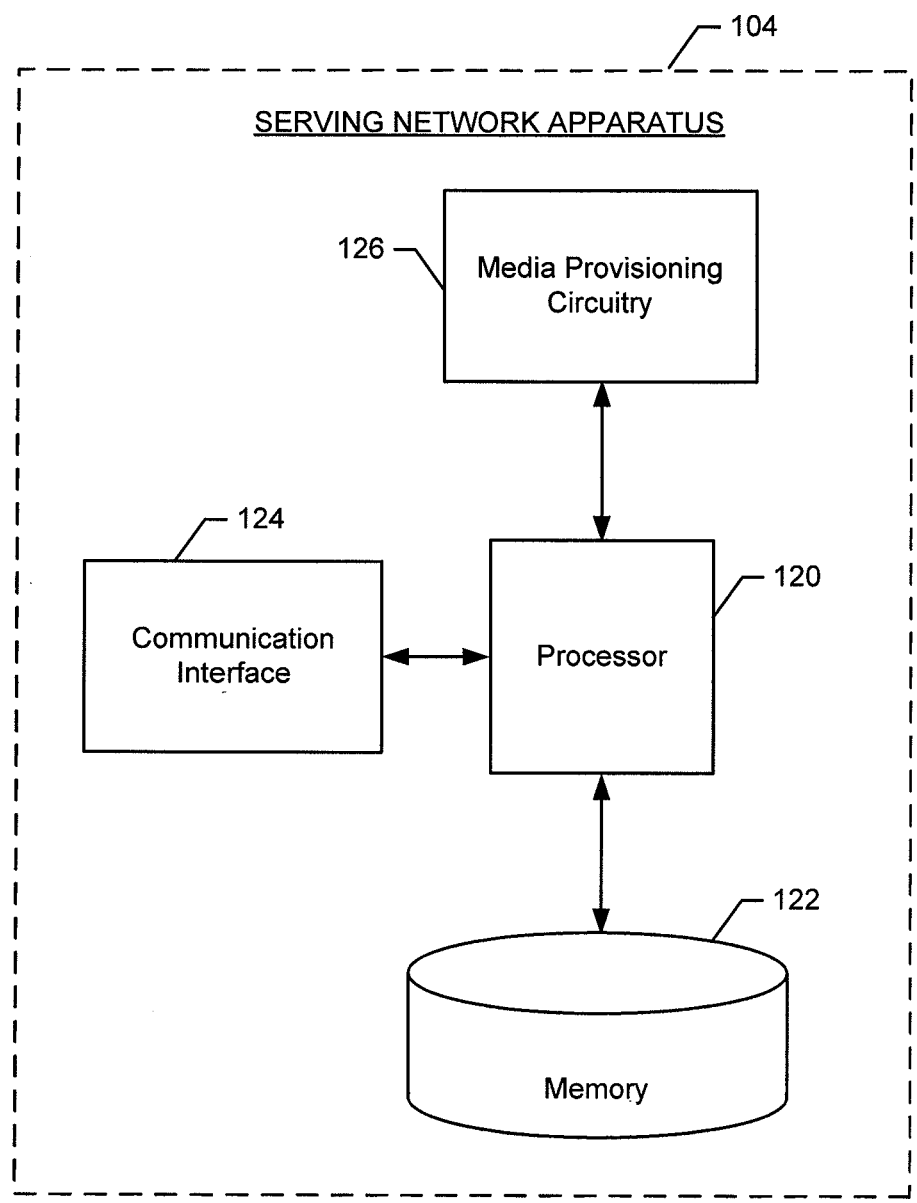
FIG. 4 illustrates a block diagram of a serving network apparatus according to some example embodiments of the present invention.

Referring now to FIG. 4, FIG. 4 illustrates a block diagram of a serving network apparatus 104 according to an example embodiment. In the example embodiment, the serving network apparatus 104 may comprise various means for performing the various functions herein described. These means may comprise one or more of a processor 120, memory 122, communication interface 124, or media provisioning circuitry 126. The means of the serving network apparatus 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 122)

that is executable by a suitably configured processing device (e.g., the processor 120), or some combination thereof.

In some example embodiments, one or more of the means illustrated in FIG. 4 may be embodied as a chip or chip set. In other words, the serving network apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, and/or media provisioning circuitry 126 may be embodied as a chip or chip set. The serving network apparatus 104 may therefore, in some example embodiments, be configured to implement embodiments of the present invention on a single chip or as a single "system on a chip." As another example, in some example embodiments, the serving network apparatus 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 120 may comprise a plurality of processors. The plurality of processors may be in operative communication with each other and may be collectively configured to perform one or more functionalities of the serving network apparatus 104 as described herein. The plurality of processors may be embodied on a single computing device or distributed across a plurality of computing devices collectively configured to function as the serving network apparatus 104. In some example embodiments, the processor 120 may be configured to execute instructions stored in the memory 122 or otherwise accessible to the processor 120. These instructions, when executed by the processor 120, may cause the serving network apparatus 104 to perform one or more of the functionalities of the serving network apparatus 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 4 as a single memory, the memory 122 may comprise a plurality of memories. The plurality of memories may be embodied on a single computing device or may be distributed across a plurality of computing devices collectively configured to function as the serving network apparatus 104. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the serving network apparatus 104 to carry out various functions in accordance with various example embodiments. For example, in some example embodiments, the memory 122 may be configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the media provisioning circuitry 126 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 may be at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the serving network apparatus 104 and one or more computing devices or computing resources may be in communication. As an example, the communication interface 124 may be configured to enable communication with a terminal apparatus 102 by the network 106, a radio uplink, and/or the like. The communication interface 124 may additionally be in communication with the memory 122, and/or media provisioning circuitry 126, such as via a bus.

The media provisioning circuitry 126 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In embodiments wherein the media provisioning circuitry 126 may be embodied separately from the processor 120, the media provisioning circuitry 126 may be in communication with the processor 120. The media provisioning circuitry 126 may further be in communication with one or more of the memory 122 or communication interface 124, such as via a bus.

According to various embodiments, the media provisioning circuitry 126 may be configured to provide for distribution of media content to one or more terminal apparatuses 102 according to a DASH standard. For example, the media provisioning circuitry 126 may be configured to distribute a media presentation to one or more terminal apparatuses 102. In this regard, the media provisioning circuitry 126 may be configured to provide for distribution of a Media Presentation Description (MPD) associated with the media presentation.

In example embodiments, the media provisioning circuitry 126 may be configured to distribute an MPD comprising an indication of the one or more methods for accessing the media presentation. For example, the MPD may indicate whether the media presentation is available via one or more unicast, multicast, and/or broadcast access methods, such as PSS, DVB-H, MBMS, and/or the like.

According to some embodiments, the media provisioning circuitry 126 may configure the MPD to include unique attribute values for one or more of the access methods used to distribute the media presentation according to DASH. For example, the media provisioning circuitry 126 may configure the MPD such that the attribute values associated with unicast delivery of a media presentation, or one or more portions of the media presentation (e.g., representations, sub-representations, etc.), differ from the attribute values associated with multicast delivery of the media presentation.

The MPD schema specified in the MPEG DASH standard includes a generic DescriptorType. The MPD may contain several descriptor elements that make use of DescriptorType. The descriptor elements may all structured in the same way, namely each descriptor element may contain a @schemeIdUri attribute that provides a Uniform Resource Identifier (URI) to identify the scheme and an optional @value attribute. The semantics of the element may be specific to the scheme employed. The URI identifying the scheme may be a Uniform Resource Name (URN) or a URL. In order to use a descriptor element, a scheme identifier in the form of a URI may be defined. In an instance in which a simple set of enumerated values is sufficient for the descriptor scheme, a text string may be defined for each value in the value space for the descriptor scheme, and the text string may be included in the @value attribute. In other instances in which structured data is used for the descriptor scheme, any elements and/or attributes may be included within the descriptor element, for example using a separate namespace, which is defined by the @schemeIdUri value.

In various embodiments, the media provisioning circuitry 126 may include an element in the MPD defining the one or more possible access methods and associated unique attributes, for example an AccessDescription element derived from the generic DescriptorType. The AccessDescription element, in certain instances, may comprise an array or list of AccessDescription elements, such that each AccessDescription element of the array or list defines attributes for a particular access method. Each AccessDescription element of the array or list may have an associated unique @value attribute, or a similar associated identifier value, identifying the particular AccessDescription element, which may be used by other elements to refer to the particular AccessDescription element. In some embodiments, the associated identifier value for an AccessDescription element may be derived from the order the AccessDescription elements appear in the array or list. For example, the media provisioning circuitry 126 may assign the identifier value for the first AccessDescription element in the array or list a certain value (e.g., 0) and increment the identifier value for each subsequent AccessDescription element in the array or list by a certain positive integer value (e.g., 1).

According to example embodiments, the media provisioning circuitry 126 may configure each AccessDescription element to have one or more associated attributes and/or elements, for example as defined by a scheme associated with the AccessDescription element. In some instances, one or more of the attributes and elements included in an AccessDescription element may correspond to one or more attributes and elements included in the MPD element. For example, the AccessDescription element may comprise one or more of the following attributes and elements: @type, @availabilityStartTime, @availabilityEndTime, @minimumUpdatePeriodMPD, @minBufferTime, @mediaPresentationDuration, @timeShiftBufferDepth, @suggestedPresentationDelay, DeltaSupport, Location, BaseURL, QualityMetrics, and/or the like. In an instance in which the AccessDescription element in use contains one or more attributes and/or elements common to the MPD element, then the value(s) associated with the attribute or element defined in the AccessDescription element may take precedence over the value(s) associated with the same attribute or element defined in the MPD element, provided that the media presentation or a portion thereof is delivered and/or accessed as described in the AccessDescription element.

In various embodiments, the media provisioning circuitry 126 may associate a particular AccessDescription element with one or more portions of the media presentation. In this regard, the media provisioning circuitry 126 may associate a given AccessDescription element with one or more of an MPD element, representation element, sub-representation element, adaptation set element, and/or any other element in the hierarchy of a media presentation structure. In example embodiments, the media provisioning circuitry 126 may include an attribute that refers to a particular AccessDescription element in one or more of the hierarchical elements of a media presentation (e.g., representation, sub-representation, adaptation set, and/or the like), for example an @accessId attribute. The media provisioning circuitry 126 may set the value of the @accessId attribute of a particular element of a media presentation to refer to the @value attribute value, or a similar associated identifier value, of the one or more AccessDescription elements associated with the one or more access methods available for that particular element of the media presentation. For example, if the media provisioning circuitry 126 provides for delivery of a particular representation of the MPD by both PSS and DVB-H, the @accessId attribute of that representation element may refer to the @value attribute of an AccessDescription element associated with delivery of media content by PSS and an AccessDescription element associated with delivery of media content by DVB-H. In some embodiments, the media provisioning circuitry 126 may define more than one AccessDescription element for the same delivery type. For example, the MPD may define two different AccessDescription elements containing different attributes for different variations of PSS type media delivery.

According to various embodiments, the media provisioning circuitry 126 may specify the attributes and/or elements for inclusion in a particular AccessDescription element. In this regard, the media provisioning circuitry 126 may specify that a first AccessDescription element comprise one set of attributes and/or elements and that a second AccessDescription element comprise a different set of attributes and/or elements. In certain embodiments, the sets of attributes and/or elements associated with various AccessDescription elements may contain one or more common attributes and/or elements.

To provide a non-limiting example of some embodiments of the present invention, a media provisioning circuitry 126 may define three AccessDescription element schemes, namely a PSS AccessDescription element, a DVB-H AccessDescription element, and an MBMS AccessDescription element. According to this example, each of the three elements may comprise all of the attributes and elements described above with respect to a generic AccessDescription element scheme (i.e., @type, @availabilityStartTime, @availabilityEndTime, etc.). Each AccessDescription element may further comprise one or more attributes or elements unique to that particular AccessDescription element, based on functionality specific to the access method type associated with a particular AccessDescription element. For example, an attribute indicating that a particular access method allows enabling or simplifying of the discovery and/or startup of reception of the media content advertised in the MPD may be described in the AccessDescription element associated with that particular access method.

In the example, the PSS AccessDescription element may further comprise an attribute that specifies the access point name to be used for establishing the Packet Data Protocol (PDP) context (e.g., @accessPointName), an element specifying the allowed access networks (e.g., accessBearer), and/or the like. The DVB-H AccessDescription element of this example may further comprise an attribute specifying the center frequency of the DVB-H channel (e.g., @frequency), an attribute specifying whether to use the low priority or high priority channel in DVB-H hierarchical modulation (e.g., @useLPChannel), an attribute specifying the IP platform identifier (e.g., @IPPlatformID), an attribute identifying whether the IP platform identifier is globally unique (e.g., @DVBNetworkID), an attribute specifying the service guide provider identifier for service guide bootstrapping (e.g., @ESGProviderID), an attribute referencing the session description object (e.g., @sessionDescriptionURI), and/or the like. Additionally, the MBMS AccessDescription element of this example may further comprise an attribute referencing the associated procedure description object (e.g., @associatedProcedureDescriptionURI), an attribute referencing the protection description object (e.g., @protectionDescriptionURI), an attribute referencing the session description object (e.g., @sessionDescriptionURI), an attribute specifying the access point name for establishing the PDP context (@accessPointName), an element specifying the allowed access networks (e.g., accessBearer), and/or the like.

According to various embodiments, the media provisioning circuitry 126 may configure the attribute values of an AccessDescription element based on one or more factors associated with the access method corresponding to the AccessDescription element. In some instances, the media provisioning circuitry 126 may specify different buffering requirements for one or more AccessDescription elements, for example using the @minBufferTime attribute. The media provisioning circuitry 126 may specify whether the media presentation provided over the associated access method is live or on-demand, dynamic or static, and/or the like, for example by adjusting the @type attribute. The time period(s) that a media presentation is available by a particular access method may be specified, in certain embodiments, by the media provisioning circuitry 126 in the AccessDescription element associated with that access method, for example using the @availabilityStartTime and @availabilityEndTime attributes. In instances where the time-shift buffering depth varies for a particular access method, the media provisioning circuitry 126 may specify the depth for that particular access method, for example using the @timeShiftBufferDepth attribute.

In example embodiments, the media provisioning circuitry 126 may configure the element values of an AccessDescription element based on one or more factors associated with the access method corresponding to the AccessDescription element. In some embodiments, the media provisioning circuitry 126 may specify a unique MPD delta update schedule for a particular access method in the associated AccessDescription element, for example using the DeltaSupport element. The media provisioning circuitry 126 may, in certain instances, provide a different URL for the MPD (e.g., using the Location element) or the media segments (e.g., using the BaseURL element) depending on the access method. According to example embodiments, the media provisioning circuitry 126 may specify the quality metrics to be collected (and an associated reporting method) for a specific access method in its associated AccessDescription element. For example, the media provisioning circuitry 126 may specify that quality metrics are requested and reported only when the access method is unicast. It should be noted that the above attributes and elements are merely examples, and the media provisioning circuitry 126 may specify any number of additional or alternative attributes and/or elements in an AccessDescription element that may be used to identify values associated with a specific access method defined by the AccessDescription element. The attribute and/or element values specific to each access method may be specified and indicated per adaptation set, representation, or generally per any other hierarchy level in the hierarchical media presentation data structure.

In some embodiments, the media provisioning circuitry 126 may be embodied in an apparatus separate from a serving network apparatus 104. For example, the serving network apparatus 104 may be configured to operate as a standard HTTP web server lacking DASH functionality, while the media provisioning circuitry 126 may be embodied in a separate apparatus that provides the DASH functionality. In these embodiments, the media provisioning circuitry 126 may have access to the media content as well as information on the available access methods. In this regard, the media provisioning circuitry 126 may be configured to generate an MPD based at least in part on the media content and access method information. According to various embodiments, the media provisioning circuitry 126 may be configured to provide for transmission of the MPD to a terminal apparatus 102 via one or more serving network apparatuses 104.

According to various embodiments, the media accessing circuitry 118 may be configured to access a media presentation provided for delivery by a serving network apparatus 104. In this regard, the media accessing circuitry 118 may be configured to receive an MPD corresponding to the media presentation. The MPD may specify, in certain instances, one or more access methods that may be used to receive the media presentation, for example via one or more AccessDescription elements as described above.

In example embodiments, the media accessing circuitry 118 may determine the access methods supported by the terminal apparatus 102 associated with the media accessing circuitry 118. The ability to support a particular access method may depend, in certain instances, on one or more factors associated with the terminal apparatus 102, such as the hardware specification, the subscription status, user preferences, usage context, location, and/or the like. For example, the user of a terminal apparatus 102 may prefer to avoid accessing media presentations over a cellular network when roaming or when data transmission costs would exceed a specified limit.

The media accessing circuitry 118 may compare the access methods supported by the terminal apparatus 102 with the access methods indicated in the MPD received from the serving network apparatus 104, according to some embodiments. In this regard, the media accessing circuitry 118 may determine which, if any, of the access methods indicated in the MPD may be used by the media accessing circuitry 118 to access the media presentation given the capabilities of the terminal apparatus 102. In an instance in which none of the access methods indicated in the MPD are supported by the terminal apparatus 102 associated with the media accessing circuitry 118, the media accessing circuitry 118 may determine that the terminal apparatus 102 cannot access the media presentation. In other instances where the media accessing circuitry 118 identifies exactly one access method indicated in the MPD that is supported by the terminal apparatus 102, the media accessing circuitry 118 may access the media presentation using the identified access method. For example, the media accessing circuitry 118 may proceed with accessing the media presentation according to a regular DASH procedure using the identified access method.

In various embodiments, the media accessing circuitry 118 may identify more than one access method indicated in the MPD that are supported by the terminal apparatus 102 associated with the media accessing circuitry 118. In these instances, the media accessing circuitry 118 may be configured to select a supported access method for accessing the media presentation. The media accessing circuitry 118 may select the access method based on a comparison or consideration of the values stored in the attributes and elements of the AccessDescription elements associated with the corresponding access methods indicated in the MPD. Different access methods may be selected, in some embodiments, for different portions of the media presentation. For example, the media accessing circuitry 118 may select a broadcast access method to receive the portion of an in-progress live media presentation that has not yet occurred and a unicast access method to receive the portion of the in-progress live media presentation that has already occurred.

The selection by the media accessing circuitry 118 of the access method used to access all or a portion of a media presentation may be based on a number of factors. In some embodiments, the current location of the media accessing circuitry 118 may be used to determine which access method is likely to provide the highest quality, or to be accessible at all. For example, a DVB-H signal may not be accessible in certain regions. The dynamic nature of the location may also be considered by the media accessing circuitry 118 when selecting an access method. In an instance in which the location of the media accessing circuitry 118 is changing rapidly (i.e., the terminal apparatus 102 is moving), the media accessing circuitry 118 may select an access method that will suffer a lesser amount of degradation in reception quality. For example, receiving MPEG-2 transport stream (MPEG-2 TS) over DVB terrestrial (DVB-T) broadcast generally results in large amounts of corrupted data when the terminal apparatus 102 is moving at high speed.

In example embodiments, the media accessing circuitry 118 may select an access method for delivery of a media presentation based on the expected or measured reception bitrate or throughput for that access method. The media accessing circuitry 118 may, in certain instances, perform rate adaptation for the received DASH content by dynamically selecting a representation to be requested from an adaptation set. For example, the media accessing circuitry 118 may request one or more segments or sub-segments of the selected representation, and subsequently the media accessing circuitry 118 may re-perform the rate adaptation decision on the requested representation. According to various embodiments, the media accessing circuitry 118 may base the rate adaptation on information related to the terminal apparatus 102, such as a buffer occupancy level. For example, the media accessing circuitry 118 may receive a measurement of the buffer occupancy level based on the duration of media content received but not yet rendered. In an instance in which the buffer occupancy level exceeds a certain threshold, the media accessing circuitry 118 may request a representation having a higher bitrate than the currently requested representation. Similarly, in an instance in which the buffer occupancy level is lower than a certain threshold, the media accessing circuitry 118 may request a representation having a lower bitrate than the currently requested representation.

According to some embodiments, the media accessing circuitry 118 may base the rate adaptation decision on an estimate of the network throughput. In example embodiments, the media accessing circuitry 118 may select an access method and a representation(s) to be received by considering both the expected and/or measured reception bitrate and/or throughput for that access method as well as the preference of the rate adaptation logic or method on the representation(s) that may be subsequently requested. For example, in an instance in which the rate adaptation logic suggests switching to a higher bitrate representation, the media accessing circuitry 118 may conclude that the current access method does not support the higher bitrate in real-time delivery and decide to continue receiving the current representation. In another example, the media accessing circuitry 118 may determine that the reception bitrate of the current access method is expected to decrease and decide to switch to a lower bitrate representation using the same access method. In yet another example, the media accessing circuitry 118 may decide to continue receiving the current, or a higher bitrate, representation and switch to another access method configured to provide a suitably high reception bitrate.

The media accessing circuitry 118 may consider the future context of the terminal apparatus 102 (e.g., using the predicted route and speed) in making the selection of access methods. For example, the media accessing circuitry 118 may consider on-going navigation of the terminal apparatus 102 in deciding which access method is most likely to provide high quality service along the identified route. In other embodiments, the media accessing circuitry 118 may use the current and/or previous locations of the terminal apparatus 102, in certain instances along with information on streets, roads, railroads, and/or the like, to determine an expected route. The media accessing circuitry 118 may base the selection of an access method on the future context of the terminal apparatus 102, for example, on the available access methods at the future expected location(s) (e.g., geographical location), the expected reception bitrate and/or expected reception quality (e.g., residual error rate) of particular access methods, and/or the like. In various embodiments, the media accessing circuitry 118 may base the selection of an access method at least in part on the rate adaptation decision as to the requested representation(s). According to some embodiments, the media accessing circuitry 118 may request a representation having a lower bitrate than the current network throughput in an instance in which the predicted future network throughput is lower. In these embodiments, the media accessing circuitry 118 may determine that the quality of the rendered content may be likely to remain stable regardless of anticipated changes in the network throughput. In other embodiments, the media accessing circuitry 118 may request a representation having a higher bitrate than the current network throughput in an instance in which the predicted future network throughput is higher and the current buffer occupancy level is sufficient to smooth out a reception bitrate that is temporarily lower than the media content bitrate.

According to various embodiments, the media accessing circuitry 118 may consider, in instances in which the access method involves non-reliable transport protocols, the expected or measured residual error rate, signal strength (e.g., measured using the signal-to-noise ratio), or other transmission error measure when deciding which access method to select. According to some embodiments, the media accessing circuitry 118 may determine that a particular supported access method is preferable based on the indicated start time of availability, such as the time indicated by the @availabilityStartTime attribute of the AccessDescription element associated with the access method. In other embodiments, the media accessing circuitry 118 may select an access method based at least in part on the time shifting buffer value (e.g., as indicated by the @timeShiftBuffer attribute of the AccessDescription element), which may affect quality of experience. For example, the media accessing circuitry 118 may select a first access method configured to provide faster start up (e.g., PSS) before selecting a second access method once the media presentation is streaming (e.g., DVB-H or MBMS). The media accessing circuitry 118 may select the access method based at least in part on a comparison of the costs associated with each access method. For example, one access method (e.g., PSS) may incur costs based on the amount of data transferred, while a second access method (e.g., MBMS) may incur costs based on a flat monthly fee.

According to various embodiments, the media accessing circuitry 118 may determine whether one or more access methods are currently in use by another application on the terminal apparatus 102. In these instances, the media accessing circuitry 118 may avoid selecting those access methods in use, and instead select an access method currently not in use. For example, in an instance in which the media accessing circuitry 118 determines that the terminal apparatus 102 is currently using a mobile radio access connection (e.g., UTRAN) for accessing web content via a browser, the media accessing circuitry 118 may select a broadcast access method (e.g., DVB-H) for receiving DASH media content. The complementary use of access methods may provide more stable and enhanced audio-visual quality for the presented DASH media content. In other embodiments, the media accessing circuitry 118 may select an access method(s) already in use by another application on the terminal apparatus 102. For example, the media accessing circuitry 118 may select an access method in use based at least in part on the current battery level, the ability of the terminal apparatus 102 to use multiple access methods simultaneously, a desire to reduce battery consumption, and/or the like. In some embodiments, the media accessing circuitry 118 may consider the typical usage of a given access method by other applications on the terminal apparatus 102 when making a selection. For example, if the terminal apparatus 102 commonly uses unicast DASH access methods for a common activity such as browsing the Internet, the media accessing circuitry 118 may select a broadcast or multicast access method to avoid competing with the browsing applications.

In some embodiments, the media accessing circuitry 118 may select an access method based on the ability of the terminal apparatus 102 to utilize multiple access methods or multiple connections of the same access method at the same time. The media accessing circuitry 118 may determine that the terminal apparatus 102 is capable of utilizing both broadcast and unicast access methods simultaneously. In this regard, the media accessing circuitry 118 may decide to use both access methods to receive the media presentation. In one example, the media accessing circuitry 118 may select a unicast access method to receive the audio portion of the media presentation and a broadcast access method to receive the video portion of the media presentation. In another example, the media accessing circuitry 118 may use both access methods to obtain complementary portions of a DASH media presentation, such as multiple representations belonging to the same adaptation set. According to certain embodiments, the media accessing circuitry 118 may determine that the terminal apparatus 102 is capable of receiving the media presentation using more than one mobile radio access connection at the same time. For example, the media accessing circuitry 118 may determine that the terminal apparatus 102 contains multiple SIMs and is capable of concurrent use of radio access connections, each radio access connection being associated with a different SIM. In these embodiments, the media accessing circuitry 118 may select the same access method for use on each simultaneous connection to receive different or alternative portions of the media presentation, or the media accessing circuitry 118 may select different access methods for the simultaneous connections.

It should be understood that the factors used by a media accessing circuitry 118 to select an access method described above are not comprehensive and should not be considered as limiting the present invention. The media accessing circuitry 118 may select an access method for delivery of a media presentation based on any number of additional factors, such as those related to the attributes and/or elements described in the associated AccessDescription elements of the MPD or any other information related to the terminal apparatus 102, serving network apparatus 104, network 106, and/or the like.

Figure 5:
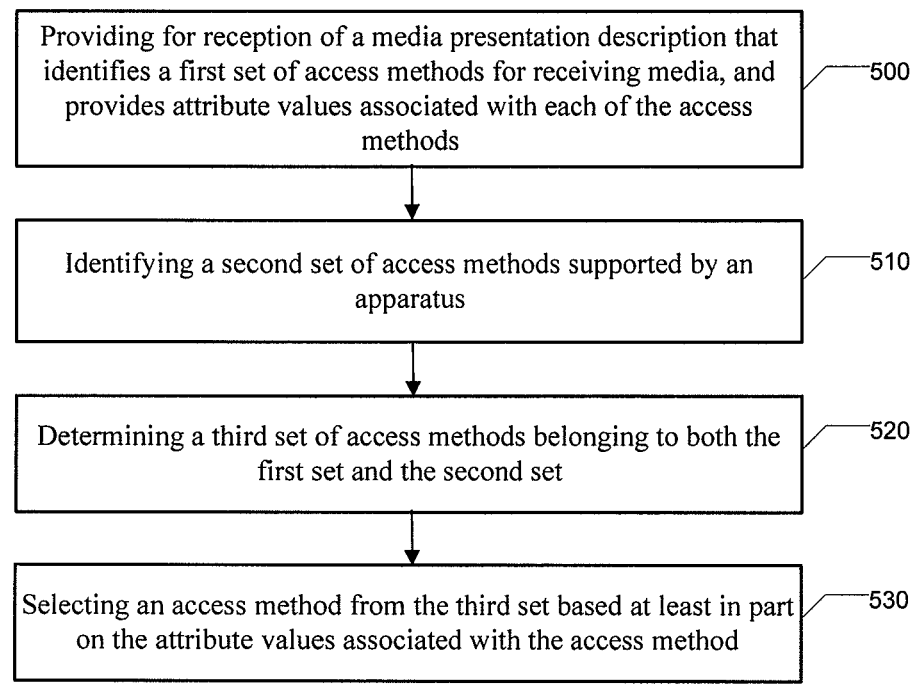
FIG. 5 illustrates a flowchart according to an example method for selecting an access method for receiving a DASH media presentation according to some example embodiments of the present invention.

FIG. 5 illustrates a flowchart according to an example method for selecting an access method for receiving a DASH media presentation. In this regard, FIG. 5 illustrates operations that may be performed at a terminal apparatus 102. The operations illustrated in and described with respect to FIG. 5 may, for example, be performed by, with the assistance of, and/or under the control of one or more of the processor 110, memory 112, communication interface 114, or media accessing circuitry 118. Operation 500 may comprise providing for reception of a media presentation description. The media presentation description may identify a first set of one or more access methods for receiving media associated with the media presentation description, and may provide one or more attribute values associated with each of the one or more access methods. The processor 110, memory 112, communication interface 114, user interface 116, and/or media accessing circuitry 118 may, for example, provide means for performing operation 500. Operation 510 may comprise identifying a second set of one or more access methods supported by an apparatus. The processor 110, memory 112, communication interface 114, user interface 116, and/or media accessing circuitry 118 may, for example, provide means for performing operation 510. Operation 520 may comprise determining a third set of one or more access methods belonging to both the first set and the second set. The processor 110, memory 112, communication interface 114, user interface 116, and/or media accessing circuitry 118 may, for example, provide means for performing operation 520. Operation 530 may comprise selecting an access method from the third set based at least in part on the one or more attribute values associated with the access method. The processor 110, memory 112, communication interface 114, user interface 116, and/or media accessing circuitry 118 may, for example, provide means for performing operation 530.

FIG. 5 illustrates a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 122, volatile memory 40, or non-volatile memory 42) of a mobile terminal, server, or other computing device (e.g., the terminal apparatus 102) and executed by a processor (e.g., the processor 120 or processor 20) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The various embodiments of the present invention provide many advantages over the current art. Some example embodiments allow a client device to determine if it is capable of accessing a media presentation via an MPD without requiring further communication related to the access methods available for the media presentation. Furthermore, advantageous embodiments allow a client to choose one or more access methods for providing optimized service quality based on the context and capabilities of the client device. The client may switch between one or more access methods seamlessly due to buffering of media content, in some embodiments. Additionally, certain advantageous embodiments permit a client to access different portions of the media content through different access methods simultaneously. For example, after tuning in late to a live broadcast of a media presentation, a client may access the earlier broadcast portion over a unicast channel while accessing the live content over a broadcast channel simultaneously.

The embodiments of the present invention provide further advantages to the distributor of the media content. According to advantageous embodiments, a media server may provide different media components exclusively over different access methods. For example, the media server may provide standard clients an audio portion of the media presentation over a broadcast channel, while further providing premium clients the video portion of the media presentation over a unicast channel. Similarly, in other advantageous embodiments, a media server may provide different layers of a media component (e.g., layers of H.264/SVC video or views of H.264/MVC video) exclusively over a particular access method. For example, a media server may provide low base-quality video over a broadcast channel (e.g. MBMS or DVB-H) to standard users while providing enhancement layers to improve the video quality over unicast (e.g. PSS) only for premium users. The media server may additionally, according to advantageous embodiments, make certain types of media content accessible via different access methods based on the time of day. For example, a media server may provide access to a sporting event over a broadcast channel while the sporting event is live for a first type of customer, and then make the sporting event available for on-demand access to a different type of customer over a unicast channel once the sporting event has ended.

The above described functions may be carried out in many ways. For example, any suitable means for carrying out each of the functions described above may be employed to carry out embodiments of the invention. In example embodiments, a suitably configured processor (for example, the processor 110 and/or processor 120) may provide all or a portion of the elements of the invention. In other embodiments, all or a portion of the elements of the invention may be configured by and operate under control of a computer program product. The computer program product for performing the methods of embodiments of the invention may comprise a computer-readable storage medium, such as the non-volatile storage medium (for example, the memory 112 and/or memory 122), and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
providing for reception of a media presentation description, wherein the media presentation description identifies a first set of one or more access methods for receiving media associated with the media presentation description, and wherein the media presentation description provides an access description element associated with each of the one or more access methods, wherein each access description element defines a set of attribute values that is unique to its associated access method;
identifying a second set of one or more access methods supported by an apparatus;
determining a third set of one or more access methods belonging to both the first set and the second set; and
selecting an access method from the third set based at least in part on the set of attribute values contained in the access description element associated with the access method, and a future context of the apparatus using predicted route and speed of the apparatus, an expected reception bitrate or expected reception quality of a particular access method at the future context;
wherein the selected access method comprises a unicast access method, a broadcast access method, or a multicast access method; and
wherein selecting the access method further includes:
selecting a first access method for receiving a first predefined portion of the media associated with the media presentation description; and
simultaneously selecting a second access method for receiving a second predefined portion of the media associated with the media presentation description, wherein the apparatus is capable of utilizing the first access method and the second access method simultaneously.

2. The method of claim 1, wherein the first predefined portion of the media comprises a first segment, sub-segment, or representation and the second predefined portion of the media comprises a second segment, sub-segment, or representation.

3. The method of claim 2, further comprising:
selecting the first segment, sub-segment, or representation for reproduction during a first period of time; and
switching to the second segment, sub-segment, or representation for reproduction during a second period of time.

4. The method of claim 1, wherein the first predefined portion comprises a first component of the media and the second predefined portion comprises a second component of the media.

5. The method of claim 1, wherein selecting an access method from the third set further comprises:
determining one or more access methods currently in use by the apparatus; and
selecting an access method from the third set, wherein the selected access method differs from the one or more access methods currently in use by the apparatus.

6. An apparatus comprising:
at least one processor; and
at least one memory comprising computer program code, the at least one memory and the computer program code configured to, with the at least one processor, cause the apparatus at least to:
provide for reception of a media presentation description, wherein the media presentation description identifies a first set of one or more access methods for receiving media associated with the media presentation description, and wherein the media presentation description provides an access description element associated with each of the one or more access methods, wherein each access description element defines a set of attribute values that is unique to its associated access method;
identify a second set of one or more access methods supported by the apparatus;
determine a third set of one or more access methods belonging to both the first set and the second set; and
select an access method from the third set based at least in part on the set of attribute values contained in the access description element associated with the access method, and a future context of the apparatus using predicted route and speed of apparatus, an expected reception bitrate or expected reception quality of a particular access method at the future context;
wherein the selected access method comprises a unicast access method, a broadcast access method, or a multicast access method; and
wherein the at least one memory and the computer program code are configured to, with the at least one processor, cause the apparatus to further select the access method by causing the apparatus to:
select a first access method for receiving a first predefined portion of the media associated with the media presentation description; and
simultaneously select a second access method for receiving a second predefined portion of the media associated with the media presentation description, wherein the apparatus is capable of utilizing the first access method and the second access method simultaneously.

7. The apparatus of claim 6, wherein the first predefined portion of the media comprises a first segment, sub-segment, or representation and the second predefined portion of the media comprises a second segment, sub-segment, or representation.

8. The apparatus of claim 7, the at least one memory and the computer program code are configured to, with the at least one processor, cause the apparatus to:
select the first segment, sub-segment, or representation for reproduction during a first period of time; and
switch to the second segment, sub-segment, or representation for reproduction during a second period of time.

9. The apparatus of claim 6, wherein the first predefined portion comprises a first component of the media and the second predefined portion comprises a second component of the media.

10. The apparatus of claim 6, wherein in order to select an access method from the third set, the at least one memory and the computer program code are further configured to, with the at least one processor, cause the apparatus to:
determine one or more access methods currently in use by the apparatus; and
select an access method from the third set, wherein the selected access method differs from the one or more access methods currently in use by the apparatus.

11. An apparatus comprising:
means for providing for reception of a media presentation description, wherein the media presentation description identifies a first set of one or more access methods for receiving media associated with the media presentation description, and wherein the media presentation description provides an access description element associated with each of the one or more access methods, wherein each access description element defines a set of attribute values that is unique to its associated access method;
means for identifying a second set of one or more access methods supported by an apparatus;
means for determining a third set of one or more access methods belonging to both the first set and the second set; and
means for selecting an access method from the third set based at least in part on the set of attribute values contained in the access description element associated with the access method, and a future context of the apparatus using predicted route and speed of apparatus, an expected reception bitrate or an expected reception quality of a particular access method at the future context;
wherein the selected access method comprises a unicast access method, a broadcast access method, or a multicast access method; and
wherein the means for selecting the access method further includes:
means for selecting a first access method for receiving a first predefined portion of the media associated with the media presentation description; and
means for simultaneously selecting a second access method for receiving a second predefined portion of the media associated with the media presentation description, wherein the apparatus is capable of utilizing the first access method and the second access method simultaneously.

12. The apparatus of claim 11, wherein the first predefined portion of the media comprises a first segment, sub-segment, or representation and the second predefined portion of the media comprises a second segment, sub-segment, or representation.

13. The apparatus of claim 12, further comprising:
means for selecting the first segment, sub-segment, or representation for reproduction during a first period of time; and
means for switching to the second segment, sub-segment, or representation for reproduction during a second period of time.

14. The apparatus of claim 11, wherein the first predefined portion comprises a first component of the media and the second predefined portion comprises a second component of the media.

15. The apparatus of claim 11, wherein means for selecting an access method from the third set further comprises:
means for determining one or more access methods currently in use by the apparatus; and
means for selecting an access method from the third set, wherein the selected access method differs from the one or more access methods currently in use by the apparatus.

* * * * *